Dec. 3, 1968           H. T. SPARROW           3,414,010

CONTROL APPARATUS

Filed Nov. 1, 1965

*INVENTOR.*
HUBERT T. SPARROW

BY *Francis A. Sirr*

ATTORNEY

United States Patent Office 3,414,010
Patented Dec. 3, 1968

3,414,010
CONTROL APPARATUS
Hubert T. Sparrow, Edina, Minn., assignor to Honeywell Inc., Minneapolis, Minn., a corporation of Delaware
Filed Nov. 1, 1965, Ser. No. 505,882
13 Claims. (Cl. 137—495)

ABSTRACT OF THE DISCLOSURE

A modulating valve utilizing a multilayered magnetostrictive member which flexes upon application of an electric current. In one embodiment, flexure of the member exerts variable pressure on a diaphragm to variably restrict a pilot valve causing modulation of a main valve output. In a second embodiment, the magnetostrictive member directly operates a step opening modulating valve. Also disclosed is a pulse operated, modulating valve which maintains a variably open valve condition between pulses.

---

This invention relates to control apparatus, and more particularly, to valves utilizing multi-layered magnetostrictive members to modulate fluid flow.

It is well known that there are two types of magnetostrictive action, positive, and negative. A positive magnetostrictive material increases in length with an increase in flux density in the material. A negative magnetostrictive material decreases in length with an increasing flux density. Positive magnetostrictive material is also referred to as material having a positive coefficient of magnetostriction, and negative magnetostrictive material is referred to as material having a negative coefficient of magnetostriction. The magnetostrictive action is a function of the current in an electromagnetic coil positioned to create a closed flux path through the magnetostrictive material.

It is also well known that positive and negative magnetostrictive materials may be bonded together to form a multilayered member which flexes when a current is applied to it. The present invention utilizes the fact that the magnetostrictive deflection is related to the applied current to provide an improved modulating valve which may be electrically energized from a low voltage power source such as a thermopile. The invention further provides a simply constructed, step opening, modulating valve. Also provided is a pulse operated, modulating valve which maintains a partially open condition between pulses.

Figure 1:
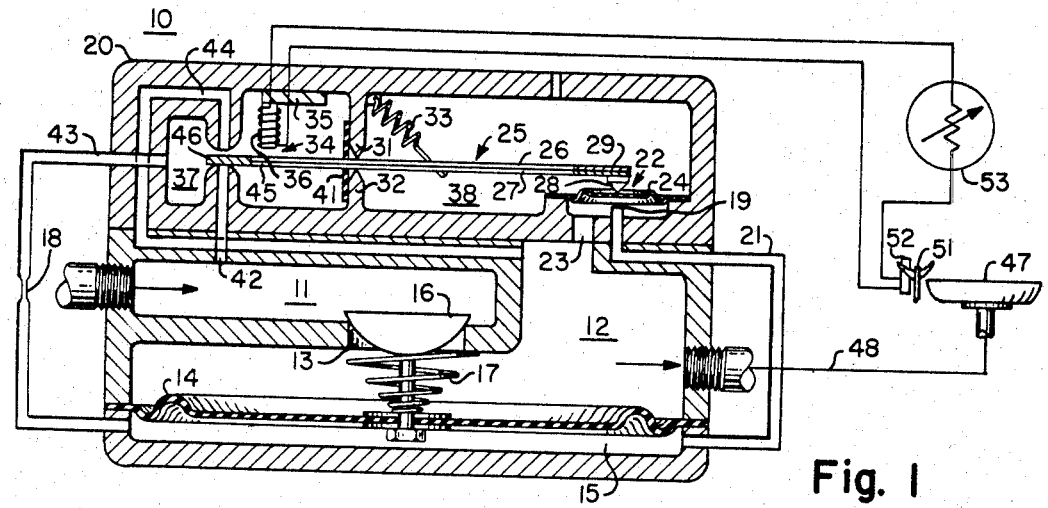
Figure 2:
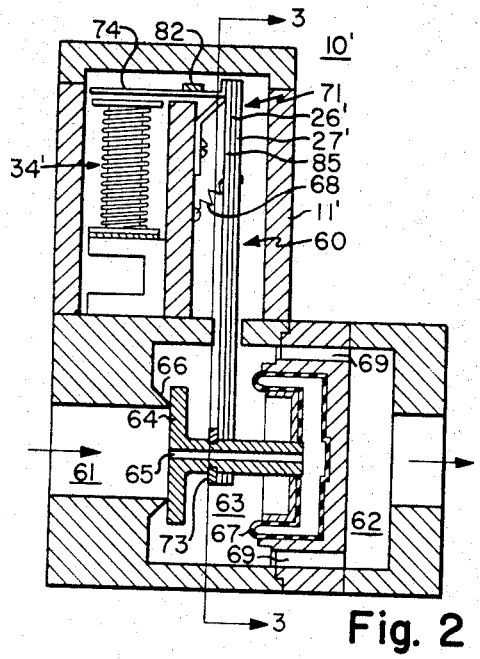
Figure 3:
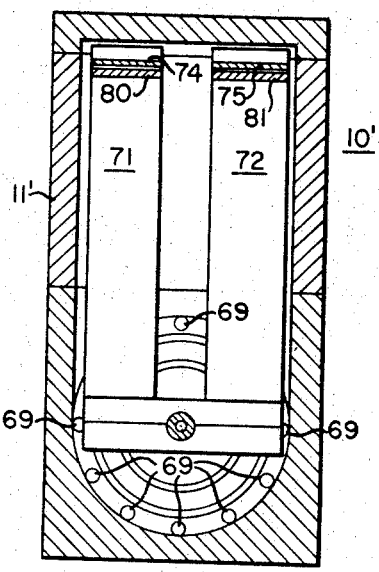
Figure 4:
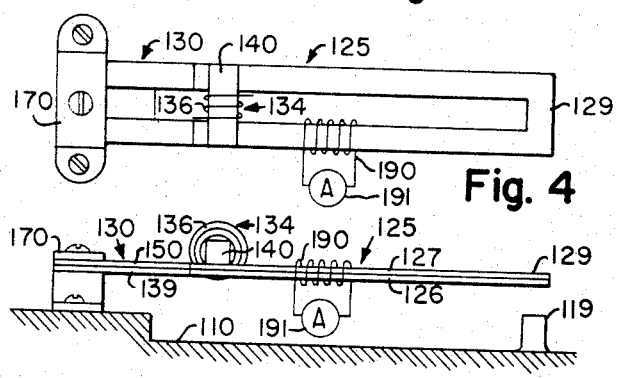
Figure 5:
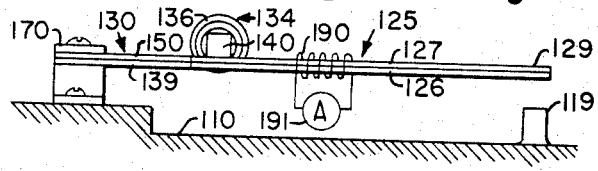

The invention will be more fully understood when taken in conjunction with the following detailed description and drawings wherein: FIGURE 1 is a partially cross sectioned schematic view of a valve system utilizing a multi-layer magnetostrictive operator; FIGURE 2 is a diagrammatic cross sectional view of a step opening valve utilizing a multi-layered magnetostrictive operator; FIGURE 3 is a diagrammatic cross sectional view of FIGURE 2 taken along line 3—3; FIGURE 4 is a top view of a multilayered magnetostrictive valve operator with a memory; and FIGURE 5 is a side view of the valve of FIGURE 4.

Referring now to FIGURE 1, there is shown a valve, generally designated 10, with a valve body 20 having a main inlet chamber 11, a main valve outlet chamber 12, and a valve port 13 communicating therebetween. A moving wall, here shown as a diaphragm 14, separates outlet chamber 12 from a pressure chamber 15 and supports a valve closure member 16 in a position to variably restrict port 13. A bias means, here shown as a spring 17, yieldably biases closure member 16 in a closed position in port 13.

Valve 10 of FIGURE 1 further includes fluid passage means therethrough here shown as an inlet passage 21, to a port 19 of a modulating pilot valve, generally designated 22, and an outlet passage 23 to main valve outlet chamber 12. A movable wall, here shown as a diaphragm 24, is positioned to variably restrict inlet passage 21 for modulating the valve output. Diaphragm 24 is operated by a multi-layer magnetostrictive means here shown as an ambient temperature compensated U-shaped magnetostrictive bimetallic member 25 deflectably mounted on valve body 20. The magnetostrictive bimetal 25 includes a positive magnetostrictive layer 26 and a negative magnetostrictive layer 27. One means for ambient temperature compensating bimetal 25 is to make it a trimetal containing a third layer of material having a thermal expansion coefficient matched to that of one of the bimetal layers. The third layer contacts the bimetal face opposite the layer having the matched expansion coefficient. Use of such a trimetal eliminates problems of heat transfer effects created by coil heat. The base 29 of the U-shaped bimetal member operates diaphragm 24 through an adjusting means 28. Magnetostrictive bimetal 25 is pivotally mounted on valve body 20 by a pair of knife edges 31 and 32. Bias means, here shown as a spring 33, yieldably bias the magnetostrictive member in a first position. Electromagnet means, here shown as an electromagnet generally designated 34 having a U-shaped ferromagnetic core 35 with a pair of coils 36 wound about the legs of core 35 in an aiding flux relation, is mounted on valve body 20 above the open end of U-shaped magnetostrictive member 25. The electromagnet 34 is disposed in a chamber 37 which is isolated from a chamber 38 containing modulating valve 22 by a flexible fluid tight sealing means 41.

Valve 10 contains further fluid passage means, here shown as a passage 42 containing a restriction 18, connects main valve inlet chamber 11 to chamber 37, a passage 43 connecting fluid tight valve chamber 37 to main valve pressure chamber 15, and a passage 44 connecting chamber 37 to main valve outlet chamber 12. A portion 45 of U-shaped magnetostrictive bimetallic member 25 forms an armature means cooperable with electromagnet 34 upon a predetermined energization of magnet 34 to pivot magnetostrictive member 25 to a second position. The open end of the U-shaped magnetostrictive member is cooperable with further valve closure means movable between first and second positions by the pivoting of magnetostrictive member 25. When magnetostrictive member 25 pivots to the second position, the closed end of the U-shaped magnetostrictive member exerts a predetermined amount of pressure on diaphragm 24 thereby restricting flow out of port 19. The further valve closure means is here shown as a nonmagnetic member 46 connecting the open ends of magnetostrictive member 25.

Main valve inlet chamber 11 is connected to fluid supply means, not shown, and main valve outlet chamber 12 is connected to the main burner 47 by connection means 48. A pilot burner 51 is fed from the fluid supply means by a separate line, not shown. A thermopile 52 is heated by pilot burner 51 and is electrically connected through a variable impedance thermostat 53 to the electromagnet coils to provide the current for operating valve 10. Any source of DC voltage may of course be substituted for the thermopile 52.

The operation of FIGURE 1 is as follows. Fluid is supplied to main valve inlet chamber 11 by the fluid supply means. Main valve closure member 16 is biased in a normally closed position so there is no communication to main valve outlet chamber 12. Spring 33 biases magnetostrictive bimetallic member 25 in the first position so that nonmagnetic closure member 46 closes passage 42 from main valve inlet chamber 11. At that time, main valve pressure chamber 15 is connected to outlet pressure through passage 43, restriction 18, valve chamber 37, and passage 44. Insufficient current flows through electromagnet 34 to pivot the magnetostrictive member against the bias tension of spring 33.

When thermostat 53 calls for heat, the current through electromagnet 34 is increased to an amount sufficient to pull in armature 45 overcoming the bias created by spring 33 and pivoting magnetostrictive member 25 to the second position, thereby opening passage 42 and closing passage 44 by means of nonmagnetic member 46. Closed end 29 of U-shaped member 25 pivots and positions diaphragm 24 in a position to provide a predetermined restriction of passage 21. Fluid from main valve inlet chamber 11 then flows through passage 42, valve chamber 37, passage 43 and restriction 18 to main valve pressure chamber 15, then through passage 21, to port 19 which is a predetermined amount by diaphragm 24 restricted, and passage 23 to main valve outlet chamber 12. In the second position the pressure exerted by bimetal 25 on diaphragm 24 initially restricts the flow out of port 19 such that the flow into pressure chamber 15 through passages 42, 43 and restriction 18 is greater than the flow out of the chamber through pasage 21 and port 19. The pressure thereby created in main valve pressure chamber 15 forces main valve closure member 16 to open. As valve 16 begins to open, pressure increases in outlet chamber 12. This pressure exerts a force on diaphragm 24 opposing the force exerted by bimetal 25 and allows an increasingly greater amount of flow out through port 19. The flow out of port 19 increases until it is equal to the flow into pressure chamber 15 through passages 42, 43 and restriction 18. Valve 16 then remains in an equilibrium position which provides less fluid flow than its full opening position. Thus, step opening of valve 10 to a preselected minimum flow has been provided.

Increasing the current in electromagnet 34 above the minimal magnitude required to pivot magnetostrictive member 25 causes an increasing flux density to be developed in magnetostrictive bimetal 25. Bimetal 25 variably deflects in response to the varying current in electromagnet 34 causing variable pressure to be exerted on diaphragm 24 which is in addition to the predetermined amount of pressure exerted on diaphragm 24 when bimetal 25 is in the second position. Pressure in outlet chamber 12 is transmitted to diaphragm 24, through passage 23, and opposes the pressure exerted by magnetostrictive bimetal 25. As the pressure changes in outlet chamber 12, diaphragm 24 changes position in response to the changed forces acting upon it. Once the forces have stabilized, pressure regulation is achieved through the mechanism of feedback from outlet pressure. The larger the current in electromagnet 34, the greater the force magnetostrictive bimetal 25 exerts on diaphragm 24 tending to increase the restriction of port 19. As the restriction on port 19 increases, the pressure in main valve pressure chamber 15 rises toward inlet pressure, thereby causing main valve closure member 16 to move upward opening the main valve further. As the main valve opens, the pressure in outlet chamber 12 increases and is transmitted to diaphragm 24 tending to decrease restriction of port 19 and reclose the main valve. The new pressures on diaphragm 24 cause it to assume a new equilibrium position and to provide pressure regulation of the main valve output. Obviously, the invention can also be used in a normally open valve wherein increasing pressure or deflection of a magnetostrictive member decreases flow through the main valve.

FIGURES 2 and 3 disclose another embodiment of the invention wherein magnetostrictive bimetallic members are used to operate a direct acting step opening, modulating valve 10' without relying on the assistance of the pressure differential across a diaphragm to do the work of opening and closing the main valve seat. A valve body 11' has an inlet port 61 and an outlet port 62 connected by a chamber 63 and a plurality of holes 69. A valve closure member 64 having a longitudinal passage 65 therethrough, is disposed within chamber 63 and is normally biased against a valve seat 66 by a bias means, here shown as a spring 68 and a movable wall or Rollofram 67. A pair of magnetostrictive trimetallic members 71 and 72 are connected to form a U-shaped operator 60 by a ferromagnetic member 73 which also supports valve closure member 64. Trimetallic members 71 and 72 include negative magnetostrictive pure nickel layer 27', positive magnetostrictive nickel-iron layer 26', and a compensating aluminum layer 85. A pair of armature members 74 and 75 are attached to the open ends of U-shaped operator 60 and extend over the ends of a U-shaped electromagnet 34'. Operator 60 is pivotally mounted to valve body 11' by a pair of knife edges 80 and 81. Saturable magnetic shunt means, here shown as a ferromagnetic member 82, bridges the space between armature members 74 and 75.

In operation, valve 10' of FIGURES 2 and 3 is normally biased in a closed position by spring 68 and by inlet pressure which is transmitted through longitudinal passage 65 to movable wall 67. When a predetermined minimal current flows through electromagnet 34', armatures 74 and 75 are attracted to it, causing operator 60 to pivot about knife edges 80 and 81 opening valve closure member 64 to allow a minimal flow. As gas pressure builds up in chamber 63, that pressure is felt by the inside area of valve closure member 64 which causes a force tending to close the valve. Feedback is obtained in this way. Magnetic shunt 82 provides a low reluctance closed flux path for flux generated at the minimal current flow setting. This shunt minimizes the magnetostrictive deflection of magnetostrictive trimetal members 71 and 72 until the minimal setting is exceeded. After shunt 82 has saturated, additional flux created by increasing the current in electromagnet 34' flows through U-shaped operator 60. This increasing flux causes a variable deflection of the magnetostrictive trimetal and provides modulation of the fluid flow emerging from valve 10'. Valve 10' could also be adapted to provide step opening to a maximum flow setting and then to decrease the flow allowed with increasing current in the electromagnet by suitably changing the orientation of the magnetostrictive trimetallic members.

FIGURES 4 and 5 illustrate a further embodiment of the invention. A U-shaped magnetostrictive bimetallic member 125 is mounted on a valve body 110 by a nonmagnetic support means 170. Magnetostrictive member 125 is ambient temperature compensated by butt welding a further portion 130 of magnetostrictive bimetal of the correct length to the end of each of the legs. The further portion has the position of the positive and negative magnetostrictive materials reversed from that of the U-shaped member. That is, if the U-shaped member has a positive magnetostrictive material 126 on the bottom and a negative magnetostrictive material 127 on top, the extensions will have a negative magnetostrictive material 139 on the bottom and a positive material 150 on the top. Remanent flux retention means, here shown as a permanent magnet core 140 for an electromagnet 134, are positioned to bridge the space between the legs of U-shaped member 125. In this valve modification, the base 129 of U-shaped member 125 itself forms the valve closure member which seats against a valve port 119 in valve body 110. Readout means, here shown as coil 190 connected to ammeter 191, are positioned on one leg of U-shaped member 125. A valve such as this may be used directly or as a pilot valve to control the flow of fluids such as gas or air to a diaphragm operated larger valve.

In operation, a pulse of current applied to electromagnetic coil 136 causes flux lines to be set up in the closed flux path through permanent magnet 140 and U-shaped magnetostrictive member 125. This pulse causes deflection of magnetostrictive member 125 in a manner similar to that described in the above embodiments. Permanent magnet 140 retains a remanent flux, however, when the current pulse ends. The remanent flux causes magnetostrictive bimetallic member 125 to remain in a deflected position which is determined by the magnitude of the pulse. Magnetostrictive member 125 will return to the undeflected position only when a pulse of the correct magnitude and opposite polarity is applied to coil 136.

It has been found that the most satisfactory results can be obtained with the valve of FIGURES 4 and 5 under the following conditions. A saturating pulse is applied to electromagnetic coil 136 to cause maximum deflection of magnetostrictive bimetal 125 fully opening valve port 119. Then, a variable magnitude opposite polarity pulse is applied to partially unsaturate permanent magnet 140 and to decrease the deflection. Closure member 129 then remains in the partially restricting position until another saturating pulse is applied. Readout of the previous partially deflected position is obtained from second small coil 190 about one of the legs of U-shaped magnetostrictive member 125. Ammeter 191 connected in circuit with coil 190 gives a reading when the saturating pulse is applied. The reading has a magnitude indicative of the change in deflection from the partially deflected position to the fully deflected position. It should be pointed out that permanent magnet 140 can be eliminated if one of the magnetostrictive metals used in the combination is a metal that has or can be made to have high retentivity or remanent flux and also have a high degree of magnetostrictive force. Remendur is such a material. The valve of FIGURES 4 and 5 can thus be used in combination with a computer which controls the settings and periodically samples the positions of a number of similar valves in a pneumatic, gas, or other fluid control system.

The embodiments of the invention in which an exclusive property or right is claimed are defined as follows.

1. A valve comprising:
a valve body having fluid passage means therethrough;
multi-layered magnetostrictive means deflectably mounted on the valve body, the magnetostrictive means including a positive magnetostrictive layer and a negative magnetostrictive layer;
electromagnet means cooperable with the magnetostrictive means to cause variable deflection thereof in response to varying current in the electromagnet means; and
valve closure means operable by deflection of the magnetostrictive means to variably restrict fluid flow through the passage means.

2. A valve according to claim 1 wherein the magnetostrictive means is pivotally mounted on the valve body, the valve further comprising:
bias means for yieldably biasing the magnetostrictive means in a first position;
armature means cooperable with the electromagnet means upon a predetermined energization thereof to pivot the magnetostrictive means to a second position;
further fluid passage means through the valve body; and
further valve closure means cooperable with the magnetostrictive means by pivoting thereof to move the further closure means between first and second positions thereby controlling fluid flow through the further passage means.

3. A valve according to claim 2 wherein the magnetostrictive means includes an ambient temperature compensated U-shaped magnetostrictive member, the electromagnet means includes a U-shaped ferromagnetic core having a pair of coils disposed in aiding flux relation on the legs of the core, the valve closure means includes a flexible diaphragm, and the further valve closure means includes a nonmagnetic member connecting the ends of the magnetostrictive member.

4. A valve according to claim 1 wherein the magnetostrictive means is pivotally mounted on the valve body, the valve further comprising:
bias means for yieldably biasing the valve closure means in a first position;
armature means cooperable with the electromagnet means upon a predetermined energization thereof to pivot the magnetostrictive means to a second position; and
saturable magnetic shunt means cooperable with the armature means and the electromagnet means to minimize and control the deflection of the magnetostrictive means after pivoting thereof to the second position until a predetermined minimum current flow in the electromagnet means is exceeded.

5. A valve according to claim 4 wherein the magnetostrictive means includes ambient temperature compensated magnetostrictive multi-layered material forming at least the legs of a U-shaped ferromagnetic member, the electromagnet means includes a U-shaped ferromagnetic core having a pair of coils disposed in aiding flux relation on the legs of the core, the armature means includes a pair of ferromagnetic members connected to the free ends of the magnetostrictive legs, the magnetic shunt means includes a ferromagnetic member connecting the armature members, and the bias means includes a movable wall operable in response to inlet pressure.

6. A valve according to claim 1 which further comprises:
flux retention means for causing the magnetostrictive means to deflect upon the incidence of a current pulse in the electromagnet means and for causing that deflected position to be substantially retained until another current pulse is applied to the electromagnet means thereby providing a modulating valve with a memory.

7. A valve according to claim 6 wherein the magnetostrictive means includes an ambient temperature compensated U-shaped magnetostrictive member and the flux retention means includes permanent magnet means bridging the space between the legs of the member at a position spaced from the base of the member.

8. A valve according to claim 6 wherein the flux retention means includes at least one of the magnetostrictive layers, the one layer having a relatively high remanent flux capability.

9. A valve according to claim 1 wherein the magnetostrictive means further includes an ambient temperature compensating layer.

10. A valve according to claim 1 wherein the magnetostrictive means is pivotally mounted on the valve body and which valve further comprises bias means yieldably biasing the magnetostrictive means in a first position and armature means cooperable with the electromagnet means upon a predetermined energization thereof to pivot the magnetostrictive means to a second position thereby providing step opening of the valve.

11. A modulating valve comprising:
valve housing means having an opening defining a fluid passage;
magnetostrictive means including a multi-layered member, the member having a first layer with a positive coefficient of magnetostriction and a second layer with negative coeffiecient of magnetostriction;
mounting means mounting the magnetostrictive means on the housing means with a portion of the magnetostrictive means deflectably disposed with respect to the housing means;
closure means operable by the portion in response to deflection thereof to variably restrict the opening;
electromagnet means adapted to be connected to a source of variable magnitude current; and
positioning means positioning the electromagnet means relative to the member so that the electromagnet means provides varying strength magnetic flux in the member to cause the portion to deflect by an amount which varies as a function of the current in the electromagnet means thereby causing variable restriction of the opening.

12. A valve according to claim 11 wherein the mounting means is a pivotal mount and which valve further comprises bias means yieldably biasing the magnetostrictive means in a first position and armature means cooperable with the electromagnet means upon a predetermined energization thereof to pivot the magnetostrictive means to a second position thereby providing step opening of the valve.

13. A valve according to claim 11 wherein the positioning means includes flux retaining means to cause deflection of the magnetostrictive means when a current pulse is applied to the electromagnet means and to cause that deflection to be substantially maintained until another current pulse is applied to the electromagnet means.

References Cited

UNITED STATES PATENTS

| | | | |
|---|---|---|---|
| 2,896,044 | 7/1959 | McCreary | 335—3 |
| 2,899,972 | 8/1959 | Matthews | 137—495 |
| 2,920,529 | 1/1960 | Blythe | 335—215 XR |
| 3,126,911 | 3/1964 | Galley | 137—495 |
| 3,174,716 | 3/1965 | Salter | 251—129 |
| 3,175,132 | 3/1965 | Salter | 335—215 |
| 3,351,085 | 11/1967 | Allingham | 137—495 |
| 3,354,901 | 11/1967 | Dietiker et al. | 137—495 |

M. CARY NELSON, *Primary Examiner.*

ROBERT J. MILLER, *Assistant Examiner.*